United States Patent
Konita

(10) Patent No.: US 10,264,161 B2
(45) Date of Patent: Apr. 16, 2019

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventor: Naoya Konita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/954,800

(22) Filed: Apr. 17, 2018

(65) Prior Publication Data

US 2018/0234586 A1   Aug. 16, 2018

Related U.S. Application Data

(60) Division of application No. 15/412,478, filed on Jan. 23, 2017, now abandoned, which is a continuation of
(Continued)

(30) Foreign Application Priority Data

Aug. 14, 2014 (JP) .................................. 2014-165178

(51) Int. Cl.
*G06F 15/00* (2006.01)
*H04N 1/44* (2006.01)
(Continued)

(52) U.S. Cl.
CPC ........... *H04N 1/4413* (2013.01); *G06F 3/122* (2013.01); *G06F 3/1219* (2013.01);
(Continued)

(58) Field of Classification Search
CPC ............. H04N 1/4413; H04N 1/32765; H04N 1/4433; H04N 2201/3205; H04N 2201/3218; H04N 2201/0082
(Continued)

(56) References Cited

U.S. PATENT DOCUMENTS

2005/0275868 A1* 12/2005 Higashiura ............ G06K 15/00
                                                              358/1.14
2012/0307283 A1   12/2012 Hamada
(Continued)

FOREIGN PATENT DOCUMENTS

JP      2006-321079 A    11/2006
JP      2012-96384 A      5/2012
(Continued)

OTHER PUBLICATIONS

Mar. 30, 2018 Office Action issued in Japanese Patent Application No. 2014-165178.
(Continued)

*Primary Examiner* — Saeid Ebrahimi Dehkordy
(74) *Attorney, Agent, or Firm* — Oliff PLC

(57) ABSTRACT

An image processing apparatus includes an image processing unit, a use authority information acquisition unit, and a transmission controller. The image processing unit processes an image in accordance with an instruction from a terminal apparatus. The use authority information acquisition unit acquires use authority information in which, for each user, use authority is set for a resource that the image processing apparatus has. The transmission controller transmits, in a case where a change has occurred in a state of the resource, resource-state information, which is information regarding the state of the resource, to a terminal apparatus of a user who has authority to use the resource, in accordance with the use authority information acquired by the use authority information acquisition unit.

4 Claims, 7 Drawing Sheets

Related U.S. Application Data application No. 14/677,282, filed on Apr. 2, 2015, now Pat. No. 9,588,723.

(51) Int. Cl.
*G06F 3/12* (2006.01)
*H04L 29/06* (2006.01)
*H04N 1/00* (2006.01)
*H04N 1/327* (2006.01)

(52) U.S. Cl.
CPC .......... *G06F 3/1239* (2013.01); *G06F 3/1292* (2013.01); *H04L 63/083* (2013.01); *H04N 1/00204* (2013.01); *H04N 1/32765* (2013.01); *H04N 1/4433* (2013.01); *H04N 2201/0082* (2013.01); *H04N 2201/3205* (2013.01); *H04N 2201/3218* (2013.01)

(58) Field of Classification Search
USPC ................................................ 358/1.14–1.15
See application file for complete search history.

(56) References Cited

U.S. PATENT DOCUMENTS

| | | |
|---|---|---|
| 2014/0092431 A1 | 4/2014 | Okuno |
| 2014/0204410 A1 | 7/2014 | Osaki |
| 2015/0168910 A1 | 6/2015 | Maul |

FOREIGN PATENT DOCUMENTS

| | | |
|---|---|---|
| JP | 2012160877 A | 8/2012 |
| JP | 2013030826 A | 2/2013 |

OTHER PUBLICATIONS

Oct. 31, 2018 Decision of Refusal issued in Japanese Patent Application No. 2014-165178.

\* cited by examiner

FIG. 5

| USER NAME | SERVICE ITEM | USE AUTHORITY | | SPECIFIC ITEM | USE AUTHORITY |
|---|---|---|---|---|---|
| USER A | COPY | ALLOWED | 1000 PAGES REMAINING | PRINT MODE | COLOR/BLACK AND WHITE ALLOWED |
| | | | | TRAY | ALL ALLOWED |
| | | | | SHEET SIZE | A4 ALLOWED |
| | PRINT | NOT ALLOWED | | PRINT MODE | NOT ALLOWED |
| | | | | TRAY | NOT ALLOWED |
| | | | | SHEET SIZE | NOT ALLOWED |
| | FAX | NOT ALLOWED | | | |
| | SCAN | ALLOWED | 9999 PAGES REMAINING | READ MODE | COLOR/BLACK AND WHITE ALLOWED |
| USER B | COPY | ALLOWED | 0 PAGES REMAINING | PRINT MODE | COLOR/BLACK AND WHITE ALLOWED |
| | | | | TRAY | TRAY 1/TRAY 2 ALLOWED |
| | | | | SHEET SIZE | ALL ALLOWED |
| | PRINT | ALLOWED | 500 PAGES REMAINING | PRINT MODE | ONLY BLACK AND WHITE ALLOWED |
| | | | | TRAY | ALL ALLOWED |
| | | | | SHEET SIZE | ALL ALLOWED |
| | FAX | ALLOWED | 100 PAGES REMAINING | READ MODE | ONLY BLACK AND WHITE ALLOWED |
| | SCAN | ALLOWED | 90 PAGES REMAINING | READ MODE | ONLY BLACK AND WHITE ALLOWED |

FIG. 6

| NOTIFICATION DATA | NOTIFICATION TARGET USER TYPE | RELATED SERVICE | RELATED SPECIFIC ITEM | SPECIFIC SETTING |
|---|---|---|---|---|
| OUT OF COLOR TONER | MACHINE ADMINISTRATOR GENERAL USER | COPY PRINT | PRINT MODE | COLOR PRINTING |
| FAX LINE FAILURE | MACHINE ADMINISTRATOR GENERAL USER | FAX | | |
| OUT OF A4 SHEETS IN TRAY 1 | MACHINE ADMINISTRATOR GENERAL USER | COPY PRINT | TRAY | TRAY 1 |
| | | | SHEET SIZE | A4 |
| ... | ... | ... | ... | ... |

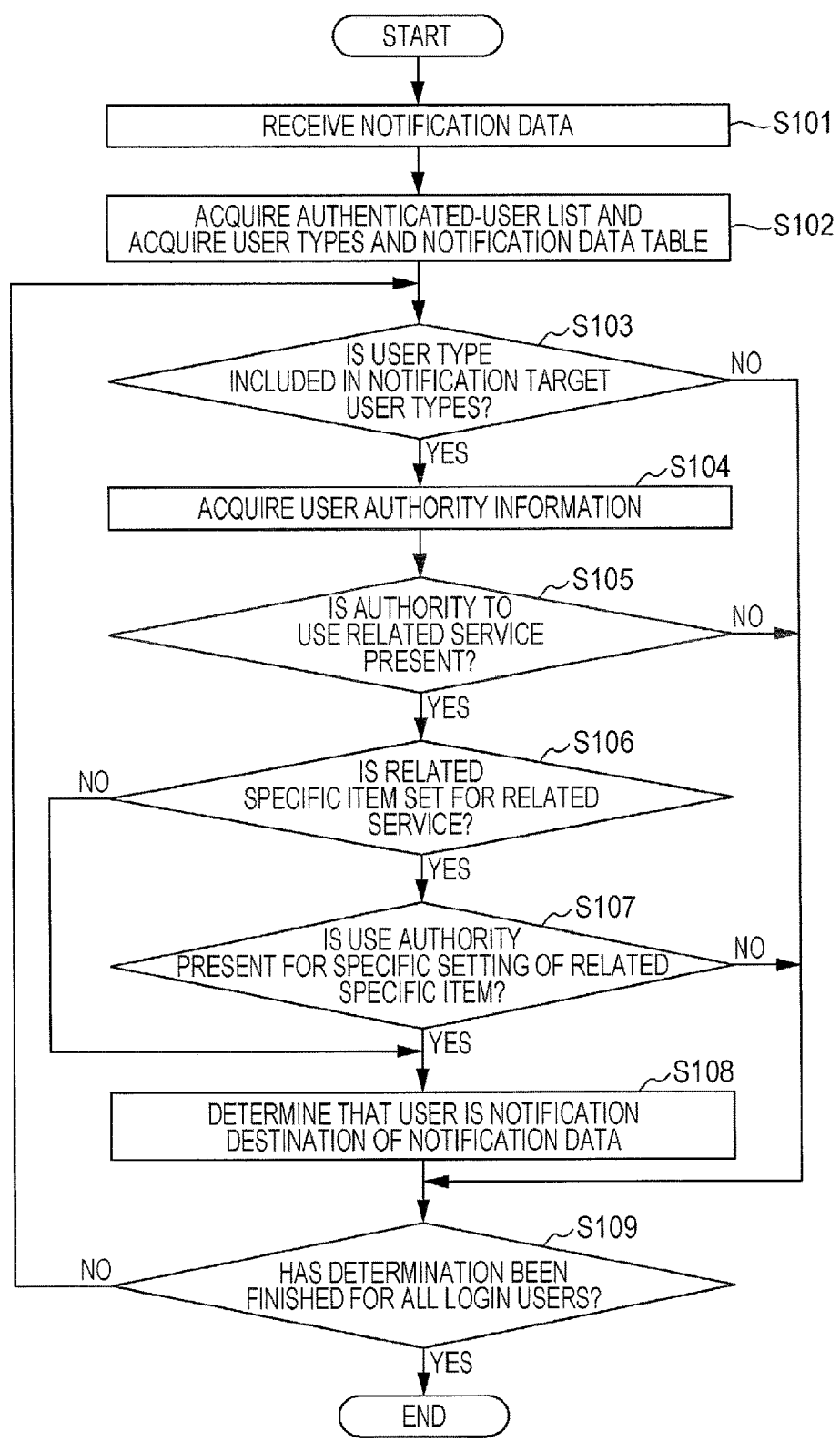

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is a divisional application of U.S. patent application Ser. No. 15/412,478 filed Jan. 23, 2017, which is a continuation application of U.S. patent application Ser. No. 14/677,282 filed Apr. 2, 2015, which is based on and claims priority under 35 USC 119 from Japanese Patent Application No. 2014-165178 filed Aug. 14, 2014. The disclosures of each of these applications are hereby incorporated by reference in their entireties.

BACKGROUND (i) Technical Field

The present invention relates to an image processing apparatus, an image processing method, and a non-transitory computer readable medium.

SUMMARY

According to an aspect of the invention, there is provided an image processing apparatus including an image processing unit, a use authority information acquisition unit, and a transmission controller. The image processing unit processes an image in accordance with an instruction from a terminal apparatus. The use authority information acquisition unit acquires use authority information in which, for each user, use authority is set for a resource that the image processing apparatus has. The transmission controller transmits, in a case where a change has occurred in a state of the resource, resource-state information, which is information regarding the state of the resource, to a terminal apparatus of a user who has authority to use the resource, in accordance with the use authority information acquired by the use authority information acquisition unit.

BRIEF DESCRIPTION OF THE DRAWINGS

An exemplary embodiment of the present invention will be described in detail based on the following figures, wherein:

FIG. 5 is a diagram illustrating an example of user authority information;

FIG. 6 is a diagram illustrating an example of a notification data table; and

FIG. 7 is a flowchart illustrating a processing procedure in a notification determination unit in the present exemplary embodiment.

DETAILED DESCRIPTION

In the following, an exemplary embodiment of the present invention will be explained in details with reference to the attached drawings.

Figure 1:
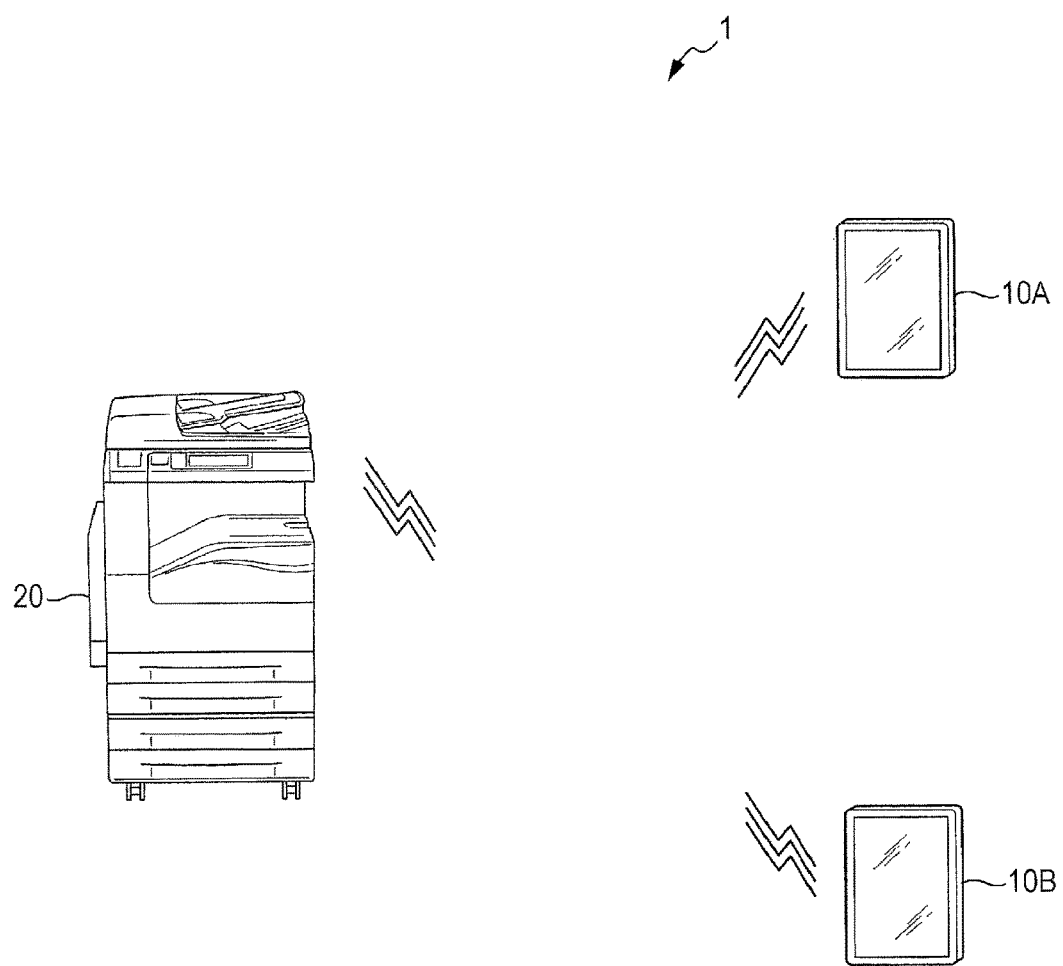
FIG. 1 is a diagram illustrating an example of an entire configuration of a notification system in a present exemplary embodiment.

FIG. 1 is a diagram illustrating an example of an entire configuration of a notification system 1 in a present exemplary embodiment.

As illustrated in FIG. 1, the notification system 1 includes a terminal apparatus 10A and a terminal apparatus 10B, which transmit, for example, an execution instruction as to image formation or print data (a job) (hereinafter referred to as "terminal apparatuses 10" in the case where the terminal apparatuses 10A and 10B do not have to be distinguished from each other). In addition, the notification system 1 includes an image processing apparatus 20, which forms images by performing image processing in accordance with, for example, a job transmitted from a certain terminal apparatus 10 among the terminal apparatuses 10 or a job input to the image processing apparatus 20 through a certain operation.

The terminal apparatuses 10 and the image processing apparatus 20 are connected to one another such that two-way communication is possible, and a session is established between a terminal apparatus 10 of a specific user authenticated by user authentication and the image processing apparatus 20. The session is a series of communication acts performed between the terminal apparatus 10 and the image processing apparatus 20 after the specific user is authenticated and until the authentication is canceled, use of the series of communication acts being allowed by the authentication. Examples of a series of communication acts include communication performed between a certain terminal apparatus 10 among the terminal apparatuses 10 and the image processing apparatus 20 in the case where a job is transmitted from the terminal apparatus 10 to the image processing apparatus 20, communication for transmitting, from the image processing apparatus 20 to the terminal apparatus 10, information regarding a specific user's use authority or notification data to be described later, and the like.

Note that plural terminal apparatuses 10 and plural image processing apparatuses 20 may be connected in the notification system 1. FIG. 1 illustrates, as an example, a configuration in which two terminal apparatuses 10 and one image processing apparatus 20 are connected. Examples of the terminal apparatuses 10 include slate devices and devices such as personal computers that may access the image processing apparatus 20 by remote access.

Figure 2:
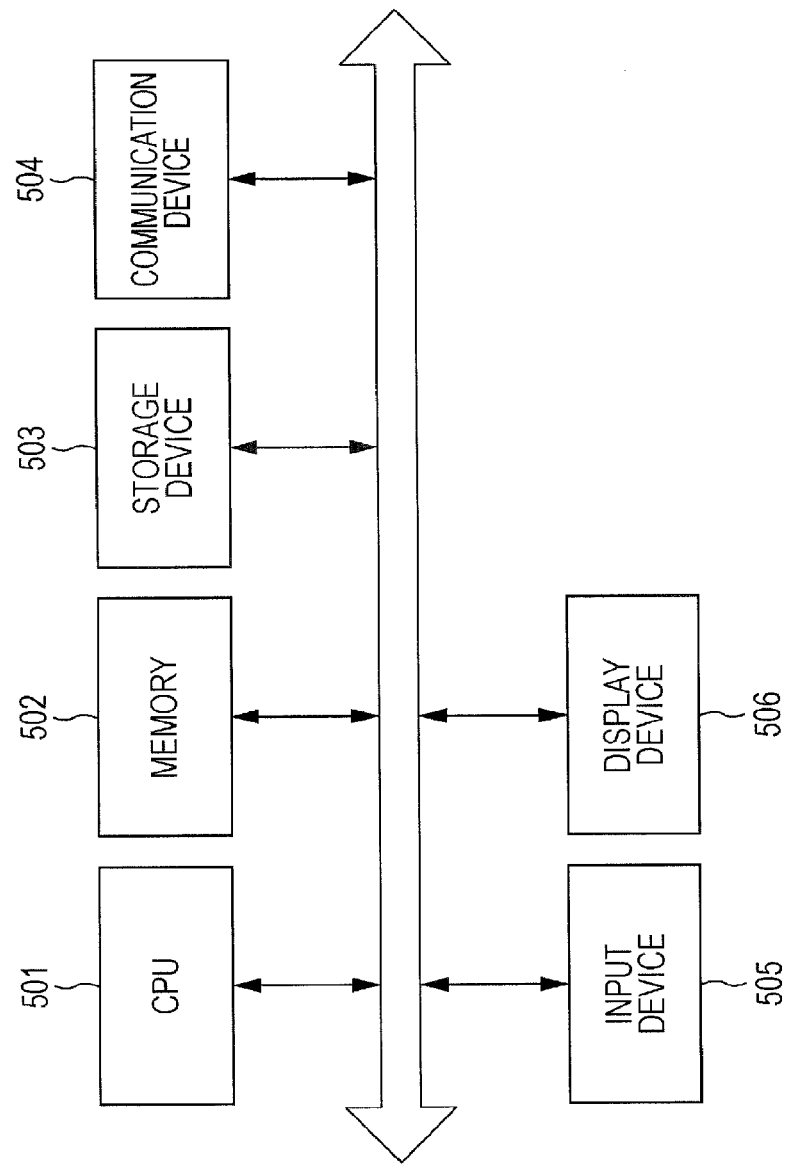
FIG. 2 is a diagram illustrating an example of a hardware configuration of a terminal apparatus to which the present exemplary embodiment is applied.

FIG. 2 is a diagram illustrating an example of a hardware configuration of a terminal apparatus 10 among the terminal apparatuses 10, to which the present exemplary embodiment is applied.

As illustrated in FIG. 2, the terminal apparatus 10 includes a central processing unit (CPU) 501 and a memory 502, which includes a read only memory (ROM) or a random access memory (RAM). In addition, the terminal apparatus 10 includes a storage device 503 and a communication device 504. The storage device 503 includes a flash memory, a hard disk drive (HDD), or a solid state drive (SSD). The communication device 504 communicates with the image processing apparatus 20. Furthermore, terminal apparatus 10 includes an input device 505 and a display device 506. The input device 505 receives an input made by a user, and the display device 506 displays a screen. In addition, in the terminal apparatus 10, structural elements are connected to each other via various buses such as a system bus, an input-output bus, and the like and communication is performed between the structural elements.

In the terminal apparatus 10 of the present exemplary embodiment, the input device 505 and the display device 506 are integrally constituted by, for example, a touch panel that displays a screen and receives setting information, or the like. Note that a configuration may also be used in which, for example, a mouse or a keyboard is used as the input device 505, and the input device 505 and the display device 506 are provided separately, an example of the display device 506 being a liquid crystal display.

In the terminal apparatus 10, the CPU 501 controls an operation of the terminal apparatus 10 including job transmission by performing a process based on a control program read from the memory 502 or the storage device 503. Note that the control program executed by the CPU 501 may be prestored in the memory 502 or the storage device 503 or may also be stored in a storage medium, which is for example a CD-ROM, and the control program is supplied to the CPU 501. Alternatively, the control program may also be supplied to the CPU 501 via a network or the like.

Note that a hardware configuration of the image processing apparatus 20 (see FIG. 1) is similar to that of the terminal apparatus 10 described above.

<Terminal Apparatus 10>

Figure 3:
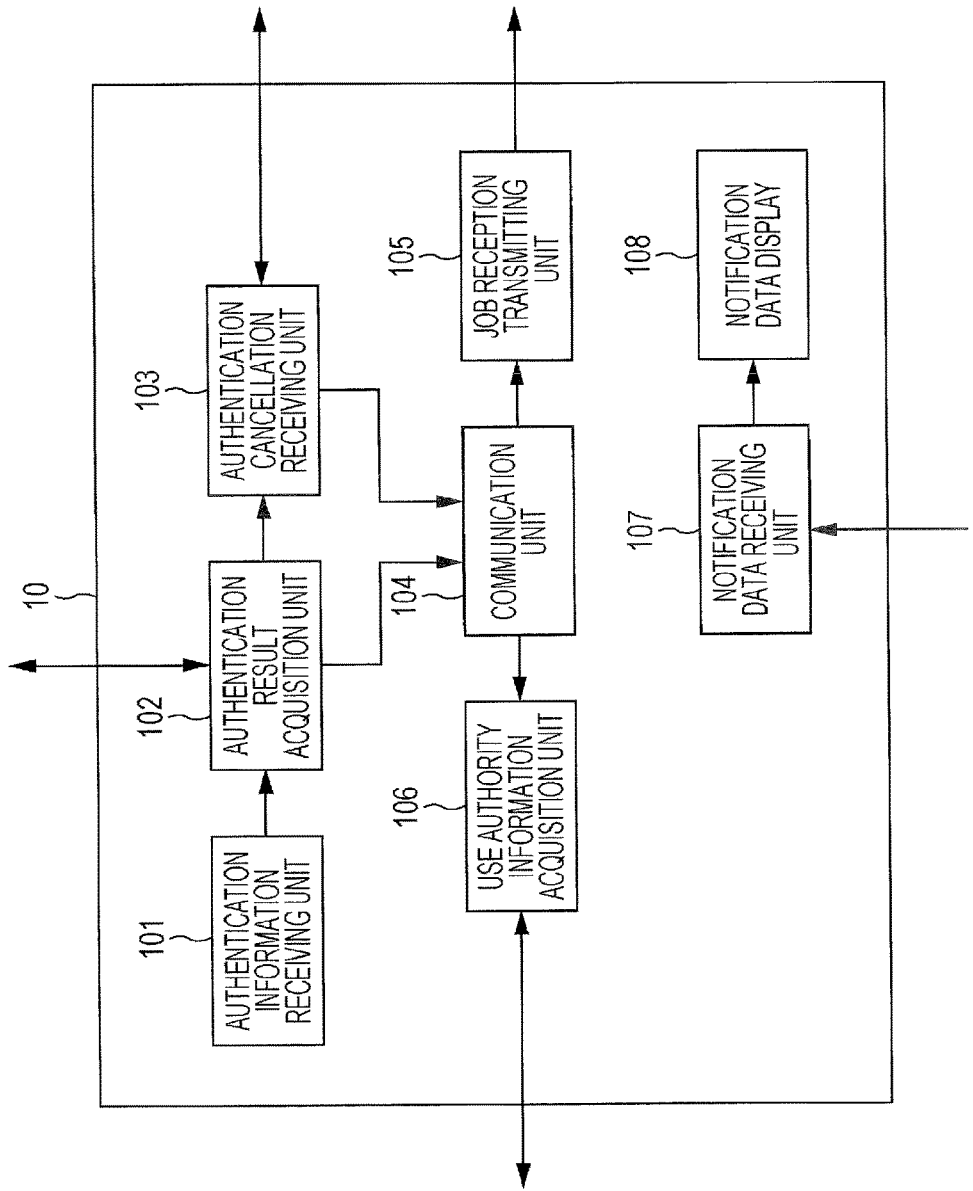
FIG. 3 is a block diagram illustrating an example of a functional configuration of the terminal apparatus.

FIG. 3 is a block diagram illustrating an example of a functional configuration of the terminal apparatus 10.

As illustrated in FIG. 3, the terminal apparatus 10 includes an authentication information receiving unit 101 and an authentication result acquisition unit 102. The authentication information receiving unit 101 receives authentication information for performing user authentication from a user. The authentication result acquisition unit 102 transmits authentication information to the image processing apparatus 20 (see FIG. 1) and acquires an authentication result indicating whether or not authentication is successful. In addition, the terminal apparatus 10 includes an authentication cancellation receiving unit 103, a communication unit 104, and a job reception transmitting unit 105. The authentication cancellation receiving unit 103 receives an authentication cancellation. The communication unit 104 establishes a session, namely a series of communication acts, between the image processing apparatus 20 and the terminal apparatus 10. The job reception transmitting unit 105 receives a job from a user and transmits the job in the case where a session is established. Furthermore, the terminal apparatus 10 includes a use authority information acquisition unit 106, a notification data receiving unit 107, and a notification data display 108. The use authority information acquisition unit 106 acquires a user's use authority information. The notification data receiving unit 107 receives notification data indicating information regarding a change in a state of the image processing apparatus 20, which will be described later. The notification data display 108 displays information on notification data.

The authentication information receiving unit 101 receives authentication information, which is a user name and a password for performing user authentication, from a user via the input device 505 (see FIG. 2). A method using a user name and a password as authentication information is employed in user authentication according to the present exemplary embodiment; however, other authentication methods may also be used as long as user authentication may be performed. Then, the authentication information receiving unit 101 transmits received authentication information to the authentication result acquisition unit 102.

The authentication result acquisition unit 102 acquires authentication information from the authentication information receiving unit 101. In addition, the authentication result acquisition unit 102 transmits the authentication information together with an address of the terminal apparatus 10, which includes the authentication result acquisition unit 102 itself, to a user authentication unit 205 of the image processing apparatus 20, which will be described later, and acquires an authentication result from the user authentication unit 205. Then, the authentication result acquisition unit 102 transmits the authentication result to the authentication cancellation receiving unit 103 and the communication unit 104, and also causes the display device 506 (see FIG. 2) to display the authentication result.

The authentication cancellation receiving unit 103 acquires an authentication result from the authentication result acquisition unit 102. Here, in the case where an authentication result is acquired indicating that authentication is successful, a session is established between the terminal apparatus 10 and the image processing apparatus 20 by the communication unit 104. Details of session establishment will be described later. The authentication cancellation receiving unit 103 receives an authentication cancellation instruction for canceling a session from a user via the input device 505. In addition, in the case where the authentication cancellation receiving unit 103 has received an authentication cancellation instruction from a user, the authentication cancellation receiving unit 103 transmits a user name and the address of the terminal apparatus 10, which includes the authentication cancellation receiving unit 103 itself, to an authentication cancellation unit 207 of the image processing apparatus 20, which will be described later. Furthermore, in the case where the authentication cancellation receiving unit 103 has received an authentication cancellation notification from the authentication cancellation unit 207, the authentication cancellation receiving unit 103 displays a message indicating that authentication is canceled on the display device 506 and notifies the communication unit 104 of authentication cancellation.

The communication unit 104 receives an authentication result from the authentication result acquisition unit 102. In addition, the communication unit 104 is notified of authentication cancellation by the authentication cancellation receiving unit 103. In the case where the communication unit 104 has received an authentication result indicating that authentication is successful from the authentication result acquisition unit 102, the communication unit 104 establishes a session between the image processing apparatus 20 and the terminal apparatus 10. Specifically, the communication unit 104 transmits an instruction that allows job transmission to the job reception transmitting unit 105 and also transmits an instruction that allows acquisition of use authority information to the use authority information acquisition unit 106.

In contrast, in the case where the communication unit 104 is notified of authentication cancellation by the authentication cancellation receiving unit 103, the communication unit 104 releases the session established between the image processing apparatus 20 and the terminal apparatus 10. Specifically, the communication unit 104 transmits an instruction that does not allow job transmission to the job reception transmitting unit 105, and transmits an instruction that does not allow acquisition of use authority information to the use authority information acquisition unit 106.

Note that, in the case where the communication unit 104 has received an authentication result indicating that authentication is unsuccessful from the authentication result acquisition unit 102 or the case where the communication unit 104 is notified of authentication cancellation by the authentication cancellation receiving unit 103 when no session is established, the communication unit 104 does not do anything.

The job reception transmitting unit 105 receives an execution instruction, for example, for printing, sending a fax, or the like or a job, which is print data, from a user via the input device 505. In addition, the job reception transmitting unit 105 receives an instruction that allows job transmission and an instruction that does not allow job transmission from the communication unit 104.

Then, in the case where the job reception transmitting unit 105 has received the instruction that allows job transmission from the communication unit 104, the job reception transmitting unit 105 transmits a job received from a user to the image processing apparatus 20. In the case where the job reception transmitting unit 105 has received the instruction that does not allow job transmission from the communication unit 104, the job reception transmitting unit 105 does not transmit the received job to the image processing apparatus 20 and displays a message indicating that job transmission is not allowed on the display device 506.

The use authority information acquisition unit 106 receives an instruction that allows acquisition of use authority information and an instruction that does not allow acquisition of use authority information from the communication unit 104. In the case where the use authority information acquisition unit 106 has received the instruction that allows acquisition of use authority information from the communication unit 104, the use authority information acquisition unit 106 requests use authority information corresponding to an authenticated user from a use authority information transmitting unit 212 of the image processing apparatus 20, which will be described later. Then, the use authority information acquisition unit 106 acquires use authority information from the use authority information transmitting unit 212, and causes the display device 506 to display functions of the image processing apparatus 20 that the user may use in accordance with the use authority information.

The notification data receiving unit 107 receives, from the image processing apparatus 20, notification data indicating information regarding states of resources (hereinafter referred to as resource state information) that the image processing apparatus 20 has. In addition, the notification data receiving unit 107 transmits the notification data to the notification data display 108 in order to notify the user of the states of the resources.

Here, the "resources" are things or units used to provide service. For example, the resources include consumables such as toner, sheets, photosensitive items, and the like. In addition to these consumables, the resources include communication lines, recording devices, light sources, power sources, and the like. Furthermore, the resources include functions realized by the image processing apparatus 20 such as a scan function, a print function, and the like.

In the case where the resources are consumables, the states of the resources refer to at least one of, for example, the amounts of the consumables remaining, insufficient amounts of the consumables remaining, and whether or not the consumables are usable. Specifically, examples of the states of the resources include the amount of toner remaining, out of toner, out of sheets, whether or not staplers are usable, and the like. In addition, for example, in the case where the resources are communication lines, the states of the resources refer to connection states of the communication lines. Specifically, examples of the states of the resources include fax-line failures, a state in which copying and printing are unusable because of a paper jam, and the like. Furthermore, in the case where the resources are functions realized by the image processing apparatus 20, the states of the resources refer to whether or not the functions are usable. Examples of the states of the resources include an insufficient capacity of a memory or a server, maintenance information indicating that the latest software program has not been introduced or the like, billing system failures, and the like.

The notification data display 108 causes the display device 506 to display information regarding a change in the state of the image processing apparatus 20, in accordance with notification data received from the notification data receiving unit 107.

<Image Processing Apparatus 20>

Figure 4:
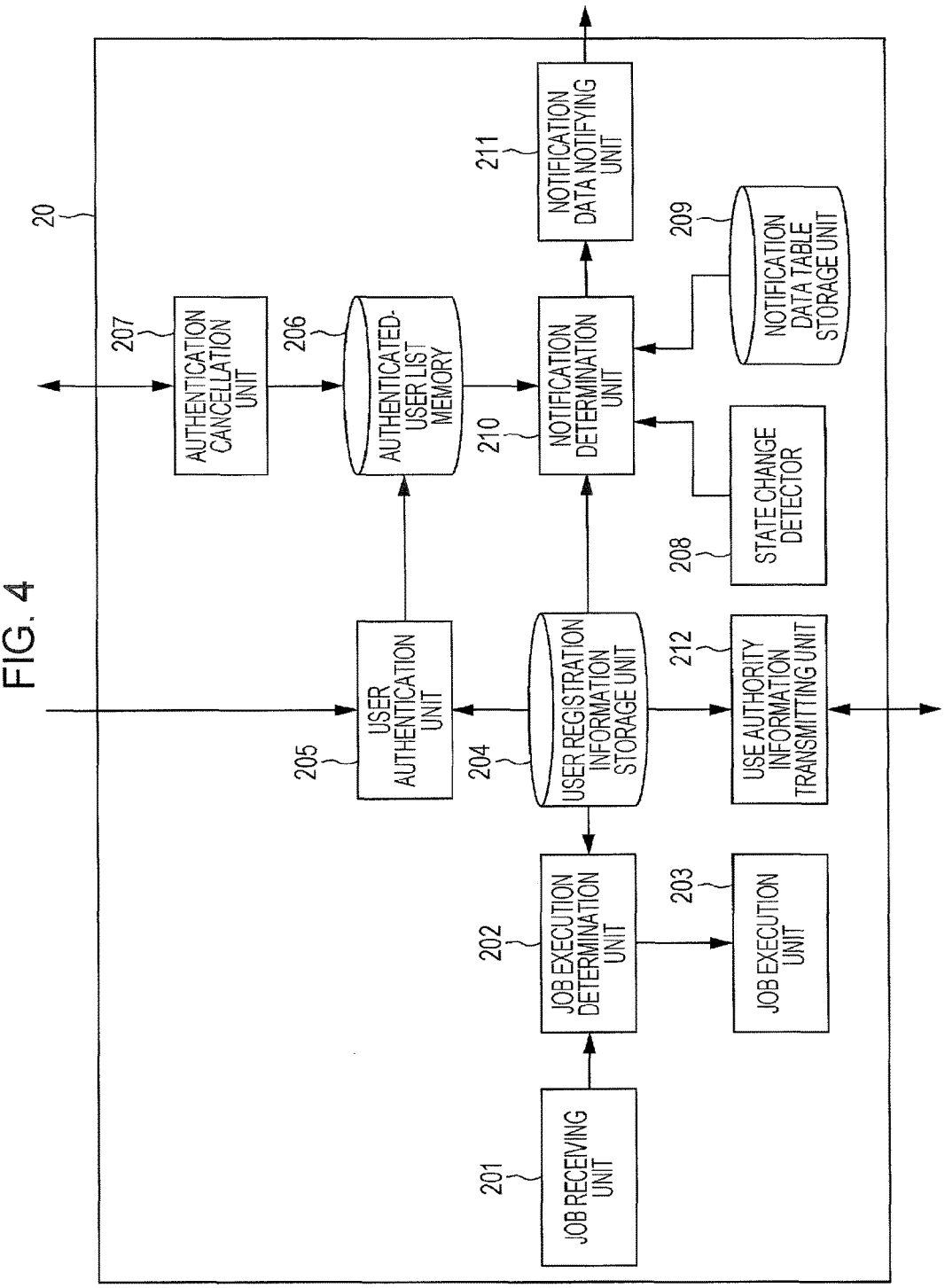
FIG. 4 is a block diagram illustrating an example of a functional configuration of an image processing apparatus.

FIG. 4 is a block diagram illustrating an example of a functional configuration of the image processing apparatus 20. FIG. 5 is a diagram illustrating an example of user authority information. FIG. 6 is a diagram illustrating an example of a notification data table.

As illustrated in FIG. 4, the image processing apparatus 20 includes a job receiving unit 201 and a job execution determination unit 202. The job receiving unit 201 serves as an example of a communication unit that receives a job from the terminal apparatus 10 (see FIG. 1) and an input device 505 (see FIG. 2) of the image processing apparatus 20. The job execution determination unit 202 determines whether or not to execute a job. In addition, the image processing apparatus 20 includes a job execution unit 203, a user registration information storage unit 204, and the user authentication unit 205. The job execution unit 203 serves as an example of an image processing unit that executes a job. The user registration information storage unit 204 serves as an example of an authority information acquisition unit in which user registration information is prestored, the user registration information being obtained by forming registration information on users into a list. The user authentication unit 205 performs user authentication. Furthermore, the image processing apparatus 20 includes an authenticated-user list memory 206, which forms user names of authenticated users and information on the authenticated users, which is addresses of terminal apparatus 10, into a list and stores the list as an authenticated-user list.

In addition, the image processing apparatus 20 includes the authentication cancellation unit 207 and a state change detector 208. The authentication cancellation unit 207 removes information on a certain authenticated user from the authenticated-user list and cancels authentication. The state change detector 208 detects a change in the state of the image processing apparatus 20. In addition, the image processing apparatus 20 includes a notification data table storage unit 209, which stores a notification data table. The notification data table is an information table in which notification conditions are associated with notification data, the notification conditions being used to determine notification destinations to which the notification data are transmitted. Furthermore, the image processing apparatus 20 includes a notification determination unit 210 and a notification data notifying unit 211. The notification determination unit 210 serves as an example of a transmission controller that determines, for authenticated users, whether each authenticated user is a notification destination of notification data. The notification data notifying unit 211 notifies authenticated users' terminal apparatuses 10, namely notification destinations, of notification data.

The job receiving unit 201 receives a job and a user name input by a user via the input device 505 of the image processing apparatus 20 and a job and a user name transmitted from the terminal apparatus 10. In addition, the job receiving unit 201 transmits a received job and a received user name to the job execution determination unit 202.

Upon receiving a job and a user name from the job receiving unit 201, the job execution determination unit 202 acquires user registration information from the user registration information storage unit 204. In addition, the job execution determination unit 202 determines whether or not to execute the job with reference to the user registration information, which will be described later. In the case where it is determined that the job is to be executed, the job execution determination unit 202 transmits the job to the job execution unit 203.

Specifically, the job execution determination unit 202 determines whether or not to execute the job in accordance with whether or not a subject user has use authority for executing the job with reference to the user registration information. That is, the job execution determination unit 202 determines that the job is to be executed in the case where the subject user, the user who has transmitted the job, has use authority for executing the job and determines that the job is not to be executed in the case where the subject user does not have use authority for executing the job. Then, in the case where it is determined that the job is not to be executed, the job execution determination unit 202 notifies the terminal apparatus 10 that the job is not to be executed, and causes the display device 506 of the terminal apparatus 10 to display a message indicating that the job is not to be executed.

Upon receiving a job from the job execution determination unit 202, the job execution unit 203 executes the job. Specifically, in the case where the job execution unit 203 has received a job transmitted from the terminal apparatus 10, the job execution unit 203 performs, for example, processing for printing, sending a fax, or the like using received print data in accordance with an execution instruction of the job. In addition, the job execution unit 203 performs, for example, processing for copying, sending a fax, scanning or the like in accordance with an instruction input by a user operating the image processing apparatus 20, in accordance with the job received via the input device 505 of the image processing apparatus 20.

The user registration information storage unit 204 pre-stores user registration information, which is obtained by forming registration information on users who use the image processing apparatus 20 into a list. Registration information on users is information in which, for a user name of each user, a password, a user type, and user authority information are associated with the user name, the password being unique information used for user authentication, the user authority information indicating use authority set for and unique to the user for the image processing apparatus 20. In the case where the user authentication unit 205 performs user authentication, the user registration information storage unit 204 transmits a user name and a password corresponding to the user name to the user authentication unit 205. Furthermore, in the case where the job execution determination unit 202 determines whether or not to execute a job, the user registration information storage unit 204 transmits user authority information to the job execution determination unit 202. Then, in the case where the notification determination unit 210 performs a notification destination determination, the user registration information storage unit 204 transmits a user type and user authority information corresponding to the user name to the notification determination unit 210. In addition, in the case where the use authority information transmitting unit 212 has received a request for user authority information from the terminal apparatus 10, the user registration information storage unit 204 transmits the user authority information to the use authority information transmitting unit 212.

Here, a user type represents the type of user and is, for example, a machine administrator, a general user, or the like. A general user is a user who has the authority to use the image processing apparatus 20 and uses resources such as copying, printing, and the like within the range of use authority given by the machine administrator. In addition, a general user is notified of information regarding consumption of consumables and information regarding abnormal states of constituents or a system in order to deal with consumption of the consumables such as running out of toner, out of sheets, or the like and an abnormal state such as a paper jam or the like.

In contrast, the machine administrator is, for example, a user who deals with mechanical maintenance and manages the image processing apparatus 20 by performing settings for security, user registration, and the like. The use authority given to the machine administrator is broader than that given to general users. Thus, the machine administrator is notified of, for example, maintenance information regarding a failure of a constituent of the image processing apparatus 20, a system failure, or the like and confidential information regarding billing information or security.

User authority information is information in which a service item, use authority for the service item, a specific item of the service item, and specific authority, which is use authority for the specific item of the service item, are associated with each other. Service items are, as illustrated in FIG. 5, copy, print, fax, scan, and the like, which are functions related to image processing that may be provided by the image processing apparatus 20.

Use authority for service items is each user's use authority. For each service item, the user's use authority is set for a function of the service item. Specifically, as illustrated in FIG. 5, in the case where the user has the authority to use a function of a certain service item, "allowed" is set. In the case where the user does not have the authority to use a function of a certain service item, "not allowed" is set. In addition, for a user whose authority to use a function of a certain service item is "allowed", a maximum number of pages is preset for the number of pages (a use unit) available for the function of the service item, for which "allowed" is set, the maximum number of pages serving as a limit used to limit use of the function of the service item. Then, every time the function of the service item is used, the number of available pages is reduced by the number of pages used. Thus, as in, for example, "1000 pages remaining" or the like, the number of remaining pages available for the function of the service item is set as use authority.

For example, in the case of a user A illustrated in FIG. 5, "allowed" and "1000 pages remaining" are set as use authority for "copy" among service items. Thus, the user A still has the authority to use "copy" for "1000 pages remaining". In addition, in the case of a user B illustrated in FIG. 5, although "allowed" is set as use authority for "copy", "0 pages remaining" is set and thus the user B is practically unable to use "copy". In this manner, in the present exemplary embodiment, even when "allowed" is set as use authority for a certain service item, in the case where its use unit has reached its limit or the like, it is expected that the service item is practically unable to be used.

Note that the number of printable pages for copy or the like or the number of readable pages for scan or the like are used as examples of the use unit in the present exemplary embodiment; however, the number of times of use, the length of time of use, a usage charge, and the like may also be used as use units.

Furthermore, for each service item, specific items of the service item are items related to plural specific settings set for the service item. Specifically, examples of a specific item include "print mode", "read mode", "tray", "sheet size", and the like. Here, "print mode" and "read mode" are items related to colors or black and white set in the case of image formation or image reading. In addition, "tray" is an item related to plural trays such as a tray 1, a tray 2, and the like in which sheets to be used to form images are housed. Then, "sheet size" is an item related to sizes of sheets to be used to form images, examples of which include A4 sheets, A3 sheets, and the like.

In addition, for each service item, specific authority is a user's use authority set for a specific item of the service item. For example, in the case of the user A illustrated in FIG. 5, "color/black and white allowed" is set as specific authority of "print mode" of "copy" and setting is performed such that the user A has the authority to use color printing and black-and-white printing. In contrast, in the case of the user B illustrated in FIG. 5, "only black and white allowed" is set as specific authority of "print mode" of "print" and setting is performed such that the user B has the authority to use black-and-white printing but does not have the authority to use color printing. Furthermore, in the case of the user A illustrated in FIG. 5, "A4 allowed" is set as specific authority of "sheet size" of "copy" and setting is performed such that the user A does not have the authority to use, for example, A3 sheets but has the authority to use only A4 sheets.

As illustrated in FIG. 4, upon receiving authentication information and the address of the terminal apparatus 10 from the terminal apparatus 10 (see FIG. 1), the user authentication unit 205 acquires a user name included in user registration information and a password corresponding to the user name from the user registration information storage unit 204. Then, the user authentication unit 205 checks, for example, the authentication information against the user registration information and transmits an authentication result to the address of the terminal apparatus 10. In addition, the user authentication unit 205 stores an authenticated user name and the address of the terminal apparatus 10 in the authenticated-user list stored in the authenticated-user list memory 206, as authenticated-user information.

Specifically, the user authentication unit 205 authenticates the authentication information in the case where, for example, a combination of the user name and the password included in the authentication information is included in the user registration information. In the case where the authentication information is not included in the user registration information, the user authentication unit 205 treats a subject user as a user who has no authority to use the image processing apparatus 20 and does not authenticate the authentication information.

The authenticated-user list memory 206 stores the authenticated-user list, which is a list of user names authenticated by the user authentication unit 205 and addresses of terminal apparatuses 10. The authenticated-user list memory 206 transmits the authenticated-user list to the notification determination unit 210 in the case where the notification determination unit 210 performs a notification determination.

The authentication cancellation unit 207 receives a user name and an address of the terminal apparatus 10 from the authentication cancellation receiving unit 103 of the terminal apparatus 10 (see FIG. 3). In addition, the authentication cancellation unit 207 removes the received user name and the received address of the terminal apparatus 10 corresponding to the user name from the authenticated-user list stored in the authenticated-user list memory 206 and releases the session with the terminal apparatus 10. Then, after performing a removal, the authentication cancellation unit 207 transmits an authentication cancellation notification to the authentication cancellation receiving unit 103 of the terminal apparatus 10. Note that the authentication cancellation unit 207 may remove the address of a terminal apparatus 10 for which a series of communication acts allowed by authentication is not performed for a certain period of time and the user name of the terminal apparatus 10 from the authenticated-user list and may release the session with the terminal apparatus 10.

The state change detector 208 detects changes in states of resources that the image processing apparatus 20 has. In addition, in the case where the state change detector 208 detects a change in a state of a constituent or a system, the state change detector 208 transmits notification data corresponding to the change in the state of the constituent or the system to the notification determination unit 210.

The notification data table storage unit 209 prestores a notification data table in which notification data are associated with notification conditions used to determine notification destinations of the notification data. Examples of the notification conditions include, as illustrated in FIG. 6, a notification target user type, related service, a related specific item, and a specific setting. Then, in the case where the notification determination unit 210 determines notification destinations, the notification data table storage unit 209 transmits the notification data table to the notification determination unit 210.

Specifically, the notification target user type is the type of user to whom notification data are transmitted and is, for example, a machine administrator, a general user, or the like. In addition, the related service is, as illustrated in FIG. 6, a function executed using a resource related to the notification data. Items corresponding to service items are set and are, for example, "copy", "print", "fax", "scan", and the like.

Furthermore, the related specific item is an item related to a specific setting for the related service. Items corresponding to specific items of the service items are set and, for example, "print mode" or "read mode", "tray", "sheet size", and the like are set.

Then, a specific setting for the related service is a specific setting related to the notification data among specific settings included in related specific items. Specifically, for example, since color toner is used for color printing, for "out of color toner" illustrated in FIG. 6, "color printing" is set as a specific setting of "print mode", which is a related specific item. Furthermore, for example, for "out of A4 sheets in tray 1", "tray 1" and "A4" are set as specific settings of "tray" and "sheet size".

The notification determination unit 210 receives, as illustrated in FIG. 4, notification data from the state change detector 208 and acquires the authenticated-user list from the authenticated-user list memory 206. In addition, the notification determination unit 210 acquires user types and user authority information corresponding to authenticated users from the user registration information storage unit 204 with reference to the authenticated-user list. Furthermore, the notification determination unit 210 acquires a notification data table corresponding to the notification data from the notification data table storage unit 209. Then, for all the authenticated users, the notification determination unit 210 determines whether or not each authenticated user is a notification destination of the notification data with reference to the notification data table and the user type and the user authority information of the authenticated user. Furthermore, the notification determination unit 210 extracts addresses of terminal apparatuses 10 of authenticated users who have been determined to be notification destinations of the notification data from the authenticated-user list, and transmits the notification data and the addresses of the terminal apparatuses 10 to the notification data notifying unit 211.

As a specific operation for determining a notification destination, the notification determination unit 210 compares the user type corresponding to each user name included in the authenticated-user list with notification target user types of the notification data table. Then, the notification determination unit 210 determines that an authenticated user whose user type is included in the notification target user types is a notification destination candidate of the notification data. In contrast, the notification determination unit 210 determines that an authenticated user whose user type is not included in the notification target user types is not a notification destination of the notification data.

In addition, the notification determination unit 210 performs a determination as to whether or not an authenticated user determined to be a notification destination candidate is a notification destination in accordance with whether or not the authenticated use has the authority to use related service, with reference to use authority for service items. Specifically, the notification determination unit 210 determines that an authenticated user who has the authority to use the related service is a notification destination candidate of the notification data. In contrast, the notification determination unit 210 determines that an authenticated user who does not have the authority to use the related service is not a notification destination of the notification data. Note that, in the case where the related service includes plural functions, when a user has the authority to use even one of the plural functions, it is determined that the user has the authority to use the related service. In the case where a user has no authority to use all the functions of the related service, it is determined that the user has no authority to use the related service. In addition, in the case where the related service is practically unable to be used since its use unit has reached its limit, even when an authenticated user has use authority, the notification determination unit 210 determines that the authenticated user is not a notification destination of the notification data as in the case where an authenticated user does not have use authority.

Furthermore, in the case where a related specific item corresponding to the notification data is present, the notification determination unit 210 performs a determination as to whether or not the authenticated user determined to be a notification destination candidate is a notification destination, in accordance with whether or not the authenticated user has use authority for the related specific item. Note that, in the case where a related specific item corresponding to the notification data is absent, the notification determination unit 210 determines that the authenticated user determined to be a notification destination candidate is a notification destination of the notification data.

Specifically, when the authenticated user determined to be a notification destination candidate has use authority for a specific setting of the related specific item with reference to the authenticated user's use authority for a specific item of the service item, the notification determination unit 210 determines that the authenticated user is a notification destination of the notification data. In contrast, the notification determination unit 210 determines that authenticated users who do not have use authority for the specific setting of the related specific item are not notification destinations of the notification data. Note that, in the case where the related specific item includes plural items, when a user has use authority for a specific setting corresponding to at least one of the plural items, it is determined that the user has use authority for the related specific item. In contrast, in the case where the user has no use authority for all the items of the related specific item, it is determined that the user has no use authority for the related specific item.

The notification data notifying unit 211 receives notification data and addresses of the terminal apparatuses 10 (see FIG. 1) of the authenticated users determined to be notification destinations of the notification data from the notification determination unit 210. In addition, the notification data notifying unit 211 transmits the notification data to the terminal apparatuses 10 of the authenticated users, the addresses of the terminal apparatuses 10 having been received.

The use authority information transmitting unit 212 receives a request for user authority information corresponding to an authenticated user of a terminal apparatus 10 from the use authority information acquisition unit 106 of the terminal apparatus 10 (see FIG. 3). In addition, the use authority information transmitting unit 212 acquires the requested user authority information on the authenticated user from the user registration information storage unit 204 and transmits the acquired user authority information to the use authority information acquisition unit 106 of the terminal apparatus 10 that has transmitted the request for user authority information.

<Processing Procedure in Notification Determination Unit 210>

Next, a processing procedure in the notification determination unit 210 in the present exemplary embodiment will be explained.

FIG. 7 is a flowchart illustrating the processing procedure in the notification determination unit 210 in the present exemplary embodiment.

First, as illustrated in FIG. 7, when a change in a state of the image processing apparatus 20 (see FIG. 4) such as a failure occurs, the notification determination unit 210 receives notification data from the state change detector 208 (step 101). In addition, the notification determination unit 210 acquires an authenticated-user list from the authenticated-user list memory 206. Then, the notification determination unit 210 acquires user types of authenticated users from the user registration information storage unit 204 in accordance with the authenticated-user list, and acquires a notification data table corresponding to the notification data from the notification data table storage unit 209 (step 102).

The notification determination unit 210 determines whether or not the user type of an authenticated user among the authenticated users is included in notification target user types of the notification data table (step 103). In the case where the user type of the authenticated user is not included in the notification target user types (No in step 103), the notification determination unit 210 determines whether or not determination has been finished for all the authenticated users (step 109). In the case where determination has not been finished for all the authenticated users (No in step 109), processing in step 103 is performed for another authenticated user. Note that in the case where determination has been finished for all the authenticated users (Yes in step 109), the process ends.

In contrast, in the case where the user type of the authenticated user is included in the notification target user types (Yes in step 103), the notification determination unit 210 determines that the authenticated user is a notification destination candidate. Then, the notification determination unit 210 acquires user authority information corresponding to the authenticated user from the user registration information storage unit 204 (step 104).

Here, specifically, in the case where, for example, the image processing apparatus 20 has run out of color toner, the notification determination unit 210 acquires a notification data table corresponding to notification data "out of color toner" illustrated in FIG. 6. In addition, for example, in the case where the user type of the user A, who is an authenticated user, is a general user, since notification target user types corresponding to "out of color toner" are "general user" and "machine administrator", the notification determination unit 210 determines that the user type of the user A is included in the notification target user types. Then, the notification determination unit 210 determines that the user A is a notification destination candidate and acquires user authority information corresponding to the user A.

Then, as illustrated in FIG. 7, the notification determination unit 210 refers to the authenticated user's use authority for service items and determines whether or not the authenticated user has the authority to use related service corresponding to the notification data (step 105). In the case where the authenticated user does not have the authority to use the related service corresponding to the notification data (No in step 105), the notification determination unit 210 performs processing in step 109.

In contrast, in the case where the authenticated user has the authority to use the related service corresponding to the notification data (Yes in step 105), the notification determination unit 210 treats the authenticated user as a notification destination candidate. Then, the notification determination unit 210 determines whether or not a related specific item corresponding to the related service of the notification data is present (step 106). Note that, in the case where the authenticated user is practically unable to use the related service even though the authenticated user has the authority to use the related service, the notification determination unit 210 performs processing in step 109 as in the case where the authenticated user does not have the authority to use the related service.

Specifically, for example, in the case of the notification data table of "out of color toner" illustrated in FIG. 6, types of the related service are "copy" and "print". In addition, for example, in the case of the use authority information on the user A illustrated in FIG. 5, for "print", which is one of the types of the related service, the user A's use authority for a service item "print" is set to "not allowed" and the user A does not have the authority to use "print". In contrast, for "copy", the other one of the types of the related service, the user A's use authority for a service item "copy" is set to "allowed". Since the user A has the authority to use "copy" and the number of available pages is "1000 pages remaining", the user A is practically able to use "copy". Thus, the notification determination unit 210 determines that the user A has the authority to use the related service and performs certain processing.

In addition, for example, in the case of the use authority information on the user B illustrated in FIG. 5, for "copy", one of the types of the related service, the user B's use authority for the service item "copy" is set to "allowed" and the user B has the authority to use "copy". However, the number of available pages is "0 pages remaining" and the user B is practically unable to use "copy". In contrast, for "print", the other one of the types of the related service, the user B's use authority for the service item "print" is set to "allowed". Since the user B has the authority to use "print" and the number of available pages is "500 pages remaining", the user B is practically able to use "print". Thus, the notification determination unit 210 determines that the user B has the authority to use the related service and performs certain processing.

Note that, for example, if the user B is practically also unable to use "print", the notification determination unit 210 performs processing as in the case where it is determined that the user B does not have the authority to use the related service.

As illustrated in FIG. 7, in the case where no related specific item corresponding to the notification data is present (No in step 106), the notification determination unit 210 determines that the authenticated user, who is a notification destination candidate, is a notification destination of the notification data (step 108). In contrast, in the case where a related specific item corresponding to the notification data is present (Yes in step 106), the notification determination unit 210 determines whether or not the authenticated user has use authority for a specific setting of the related specific item (step 107).

Specifically, the notification determination unit 210 determines whether or not the authenticated user has use authority for the specific setting of the related specific item with reference to the authenticated user's use authority for specific items of the service item. Then, in the case where the authenticated user has use authority for the specific setting of the related specific item (Yes in step 107), the notification determination unit 210 determines that the authenticated user is a notification destination of the notification data (step 108). In contrast, in the case where the authenticated user does not have use authority for the specific setting of the related specific item (No in step 107), the notification determination unit 210 performs processing in step 109.

For example, in the case of the notification data table of "out of color toner" illustrated in FIG. 6, the specific setting of "print mode", which is a related specific item, is "color printing". In addition, in the case of the use authority information on the user A illustrated in FIG. 5, "color/black and white allowed" is set as use authority for a specific item of the service item "copy", for which the user A has use authority, and the user A has the authority to use "color printing". Thus, since the user A has use authority for the specific setting of the related specific item, the notification determination unit 210 determines that the user A is a notification destination of the notification data.

In addition, in the case of the use authority information on the user B illustrated in FIG. 5, "only black and white allowed" is set as use authority for a specific item of the service item "print", for which the user B has use authority, and the user B does not have the authority to use "color printing". Thus, since the user B does not have use authority for the specific setting of the related specific item, the notification determination unit 210 determines that the user B is not a notification destination of the notification data.

The notification determination unit 210 determines whether or not determination has been finished for all the authenticated users included in the authenticated-user list (step 109). In the case where determination has not been finished for all the authenticated users included in the authenticated-user list (No in step 109), the notification determination unit 210 repeats processing from step 103 to step 108 for another authenticated user. In contrast, in the case where determination as to determination destinations has been finished for all the authenticated users, the notification determination unit 210 completes the process.

In this manner, in the present exemplary embodiment, among authenticated users, users who do not have use authority for functions of related service corresponding to notification data and specific settings of related specific items and who are practically unable to use resources related to the notification data are not determined to be notification destinations of the notification data.

In the above-described example, an example has been described in which determination is performed as to whether or not the users A and B, who are general users, are notification destinations. In the case of a machine administrator, a machine administrator is a notification destination of notification data including, for example, maintenance information and confidential information in addition to notification data of which general users are notified. In contrast, the notification data including maintenance information and confidential information are not transmitted to the users A and B, who are general users.

In addition, notification data of which desirably only the machine administrator is notified are not reported to the terminal apparatuses 10 of all users with whom sessions are established, for example, general users.

Note that, for determination of notification destinations, the case has been explained where the types of the related service are "copy" are "print"; however, the types of the related service may also be "fax" and "scan".

The configuration with which notification of notification data is performed in accordance with each user's use authority in the above-described exemplary embodiment may also be used for notification data related to a function executed without using terminal apparatuses 10. Here, examples of the function executed without using terminal apparatuses 10 include fax, scan, and the like and also include a job executed by a user actually setting a document on the image processing apparatus 20 and performing an operation through an operation panel. Even in the case where such a resource is used by a user, before actually going to the image processing apparatus 20, the user is notified of information regarding a change in the state of the resource and a message indicating that the user, who has the authority to use the resource, is unable to use the resource is displayed on the terminal apparatus 10 of the user.

Note that the configuration in which user authentication is performed by the user authentication unit 205 of the image processing apparatus 20 is used in the present exemplary embodiment; however, a configuration may also be used in which the notification system 1 is provided with an external server and the external server performs user authentication.

In addition, the configuration in which the job execution determination unit 202 provided in the image processing apparatus 20 determines whether or not to execute a job is used in the present exemplary embodiment; however, a configuration may also be used in which whether or not to execute a job is determined in a certain terminal apparatus 10 in accordance with a user's use authority information acquired by the use authority information acquisition unit 106.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor connected to a memory and configured to act as:
an acquisition unit that acquires use authority information in which, for each user, use authority is set for a function relating to a resource of the information processing apparatus; and
a transmission unit that transmits, in a case where a change has occurred in a state of the resource, information relating to a state of the resource to a user having authority to use a function relating to the resource, and does not transmit the information to a user that does not have authority to use the function relating to the resource,
wherein the change in the state of the resource is a change of resource status that influences another user that has use authority for a resource related to the chancre of the resource status.

2. The information processing apparatus according to claim 1, wherein when the function relating to the resource is unable to be used, a user, even if authenticated for the function relating to the resource, is not provided the information by the transmission unit.

3. A non-transitory computer readable medium storing a program causing a computer to execute a process, the process comprising:
acquiring use authority information in which, for each user, use authority is set for a function relating to a resource of the information processing apparatus; and
transmitting, in a case where a change has occurred in a state of the resource, information relating to a state of the resource to a user having authority to use a function relating to the resource, and does not transmit the information to a user that does not have authority to use the function relating to the resource,
wherein the change in the state of the resource is a change of resource status that influences another user that has use authority for a resource related to the change of the resource status.

4. The non-transitory computer readable medium according to claim 3, wherein when the function relating to the resource is unable to be used, a user, even if authenticated for the function relating to the resource, is not provided the information by the transmitting.

* * * * *